April 1, 1930.　　　A. G. McGREGOR　　　1,753,015
PRECIPITATING SYSTEM
Filed May 4, 1928　　　2 Sheets-Sheet 1
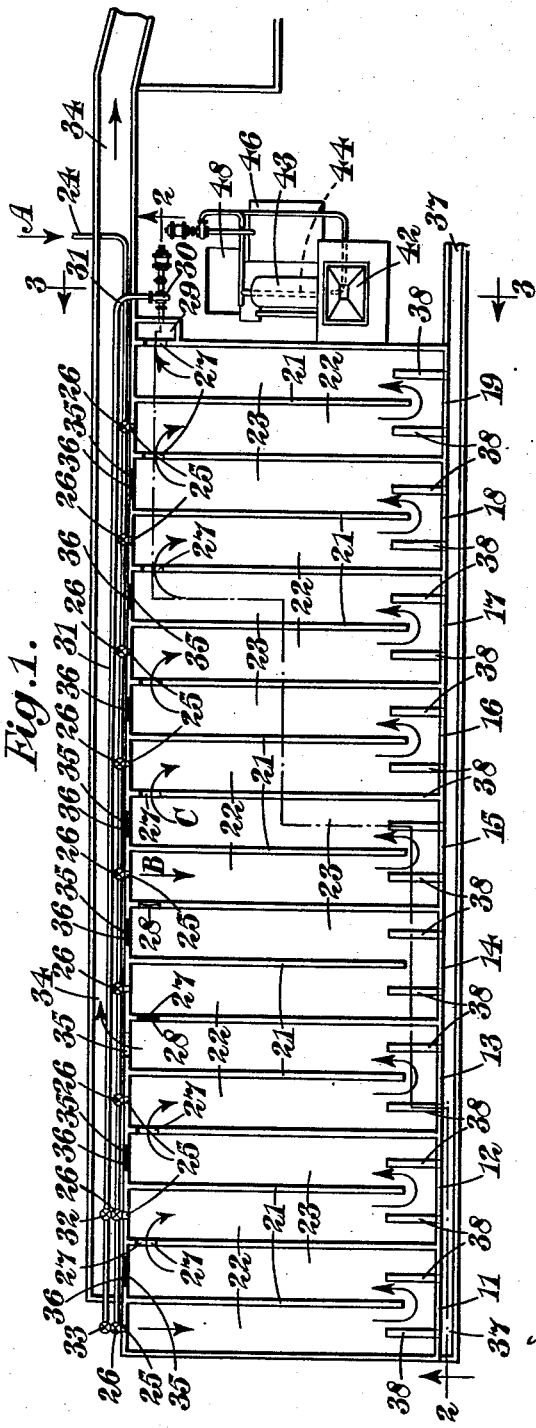
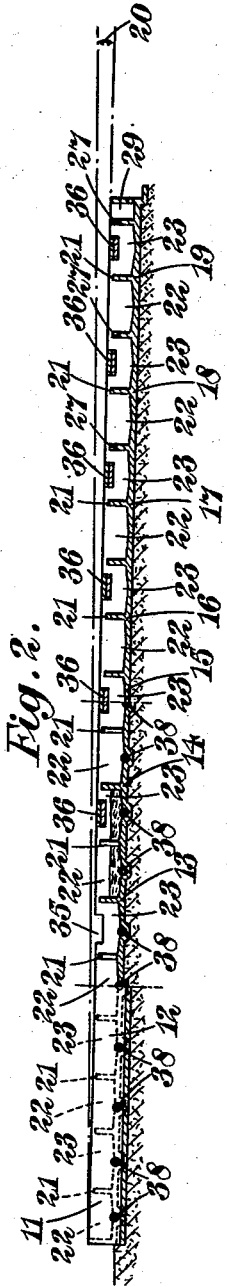

April 1, 1930. A. G. McGREGOR 1,753,015

PRECIPITATING SYSTEM

Filed May 4, 1928 2 Sheets-Sheet 2

Inventor:
Alexander Grant McGregor,
by Calvert Palm,
Attorneys.

Patented Apr. 1, 1930

1,753,015

UNITED STATES PATENT OFFICE

ALEXANDER GRANT McGREGOR, OF LONDON, ENGLAND

PRECIPITATING SYSTEM

Application filed May 4, 1928. Serial No. 275,062.

This invention comprises improvements in precipitation systems and is concerned with a process and apparatus primarily intended for precipitating copper from a copper sulphate solution by contact with iron, but it is to be understood that the process and apparatus described could be used for precipitation of other metals from solutions, for example by replacement by metals other than iron without departing from the spirit of this invention.

The invention, broadly speaking, contemplates the employment of a battery of precipitating launders connected in series with one another and means whereby new solutions may enter said series at any desired tank of the series at will and then pass through the other remaining tanks in the series and away therefrom. Provision may be made whereby one or more tanks may be cut out of the series for cleaning or for removal of precipitated copper or the like and for replacement of the precipitating contact body.

The invention moreover comprises a process for the precipitation of metals from liquids by contact with a precipitating body wherein successive batches of the precipitating body are disposed in a series of graduated age and the liquid is passed first to the oldest batch of precipitated body and thence successively through batches of decreasing age to the newest batch thereof.

The accompanying drawing illustrates diagrammatically one form of plant in accordance with the invention; in the drawing:—

Figure 1 is a plan of the plant;

Figure 2 is a longitudinal section upon the line 2, 2 of Figure 1, and

Figure 3:
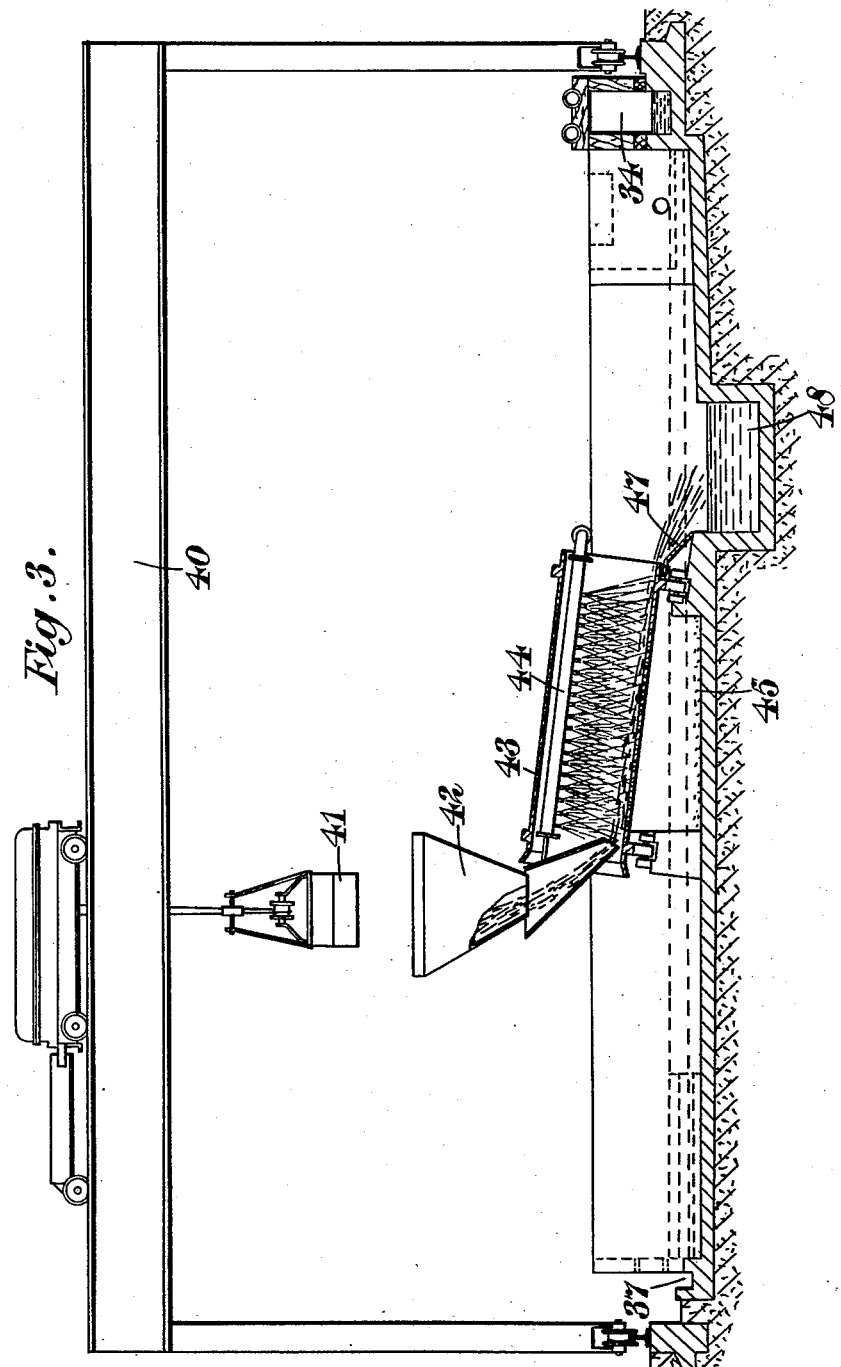
Figure 3 is a cross-section to a larger scale upon the line 3, 3 of Figure 1.

The plant comprises a battery of precipitating launders, (numbered serially 11 to 19 inclusive, upon the drawing) disposed side by side. These launders may conveniently be constructed in concrete work and the battery as a whole may be given a slight fall from one end to the other, as indicated in Figure 2 at 20, to facilitate the flow of liquids. Each of the launders is sub-divided, by a central longitudinal baffle 21 which extends from one end nearly to the other end, into a flow-channel 22 and a return-channel 23. A delivery-pipe 24 for copper solution extends alongside the ends of the launders and is provided with branches 25 controlled by valves 26. The branches 25 deliver into the end of each of the flow-channels 22 and the pipe 24 therefore constitutes a liquid-delivery manifold conduit provided with delivery-connections to the end of each of the flow-channels and control means therefor.

Between the end of each of the return-channels 23 and of the flow-channels 22 of the adjacent launder in the battery there is provided a passage 27 which can be closed when desired by inserting a gate 28. The last launder 19 of the battery is connected by its passage 27 with a sump 29. The sump 29 is connected to a centrifugal pump 30 which delivers to a return-pipe 31 having connections through valves 32, 33 with the launders 12 and 11 respectively at the other end of the battery.

Along the ends of the launders adjacent to the manifold pipe 24 there extends a liquid-collection channel 34. This is connected by passages 35 controlled by removable gates 36 with the end of each of the return-channels 33 of the launders 11 to 19. The liquid-collection channel 34 therefore constitutes a second manifold-conduit. A drainage channel 37 extends along the other ends of the launders and is connected to each of the channels 22, 23 by means of a suitable opening in the wall of the launders. A drainage gutter 38 is formed in the bottom of each of the channels 22, 23 and opens into conduit 37.

Over the apparatus described there extends a parallel crane, indicated diagrammatically at 40, provided with a grab bucket 41. The working area of the parallel crane covers the whole of the launders described and also the apparatus at the end of the battery of launders for dealing with the precipitated material. The bucket 41 is capable of picking up material, either precipitated copper or scrap iron, from the launders or delivering it thereto.

The apparatus for dealing with the precipitated material comprises a hopper 42 which delivers to a rotatable screen 43 provided with an internal water-spray 44. Below the screen is a chute 45 to receive precipitated copper passing through the meshes of the screen and deliver it to a hopper 46 (Figure 1). At the end of the screen is a chute 47 for delivering scrap iron to a receptacle 48.

In the operation of the process liquid from which metal is to be precipitated, for example copper sulphate solution, enters the plant, as shown by the arrow A, Figure 1, and is delivered to one of the launders, say 15, through a branch 25 of the pipe 24, as indicated by arrow B. Through the launder it flows along the flow-channel 22, and return-channel 23 and thence passes by the passage 27 to the next launder 16, as indicated by the arrow C. The flow proceeds in a similar manner in series through the other launders to the end launder 19 whence it is collected by the centrifugal pump 30 and delivered to the launder 11. From here it passes through the remaining launders in series until its reaches launder 13 from whence it passes into the liquid collection manifold 34 and thus the exhausted solution is withdrawn from the plant. Each of the launders 15 to 19 and 11 to 13 is filled with scrap iron, the iron in the first launder of the series 15 being the oldest (and therefore the most covered with precipitated copper) while the iron in the last launder 13 of the series is the newest. It will be noted that by means of the gates 28, 36 the launder 14 is cut out of service under these conditions and this enables it to be drained, emptied of precipitated copper and refilled with fresh iron. The precipitated copper is picked up by the bucket 41 of the travelling crane 40 and deposited in the hopper 42. The revolving grizzly 43 separates the copper from remaining portions of scrap iron mixed with it and the scrap iron is delivered to the receptacle 48. When the launder 14 has been completely emptied it is again filled, partly with the scrap iron from the receptacle 48 and, as to the balance, by fresh material. When the launder 14 has been refilled with fresh iron, it is brought into operation by removing the gate 36 and the gate 27 which separates it from the launder 13. At the same time the launder 15 is cut out of operation by proper manipulation of the gates and valve 26 belonging to it, so that it, in its turn, may be emptied and refilled. Proceeding in this way, the whole of the launders may be emptied and refilled in turn and the other launders of the series remain in operation during the emptying and refilling. The purpose of the provision of a valve 32 between the return-pipe 31 and the launder 12 is to enable circulation to be kept up during the disability or elimination of the end launder 11 of the battery.

The plant described offers considerable advantages both in initial cost and in efficiency of operation over plants hitherto known for the same purpose.

I claim:—

1. Plant for the precipitation of metals from liquids comprising in combination a battery of precipitating launders, means to deliver liquid from launder to launder in series, means to deliver liquid from one end launder of the battery to the other so that the series is closed, means to interrupt the delivery of liquid from launder to launder between any desired pair of launders, means to deliver liquid to any desired launder in the series and means to draw liquid off from any other desired launder in the series at will.

2. Plant for the precipitation of metals from liquids comprising in combination a battery of precipitating launders side by side, a longtudinal baffle in each launder to divide it into flow and return channels, a liquid-delivery manifold conduit provided with delivery connections and control means therefor to the end of each said flow-channel, a liquid-collection manifold conduit provided with connections and control means therefor to the end of each said return channel, passages for liquid between the end of each return channel and the end of the flow channel of the adjacent launder, means for closing any of said passages at will and means for collecting liquid from the last launder of the battery and returning it to the first launder thereof.

3. Plant for the precipitation of metals from liquids comprising in combination a battery of precipitating launders side by side, a longitudinal baffle in each launder to divide it into flow and return channels, a liquid-delivery manifold conduit provided with delivery connections and control means therefor to the end of each said flow-channel, a liquid-collection manifold conduit provided with connections and control means therefor to the end of each said return channel, and passages for liquid between the end of each return channel and the end of the flow channel of the adjacent launder.

4. A battery of precipitating launders containing iron of various ages and connected in series with one another, means for directing liquid first through the tank containing the oldest iron, then through the tank containing the next oldest iron, and so on to the end of the series, the solution leaving the series from the tank containing the newest iron, a tank between the ones containing the oldest iron and the newest iron cut out of the solution circuit for the removal of the copper and to receiving a new charge of iron, and means whereby the solution circuit may be changed and the solution entering the series may be made to enter the tank which was just previously the second tank traversed by the solution and the solution may be made to leave the series after passing through the tank just filled with iron.

5. A process for the precipitation of metals from liquids by contact with a precipitating body wherein successive batches of precipitating body are disposed in a series of graduated age, and the liquid is passed first to the oldest batch of precipitating body and thence successively through batches of decreasing age to the newest batch thereof.

6. A process for the precipitation of metals from liquids as claimed in claim 5 wherein when the oldest batch of precipitating body is exhausted it is removed from the series and a fresh batch of said body is added at the other end of the series.

7. A process for the precipitation of copper from solutions thereof by contact with iron wherein successive batches of iron are disposed in a series of graduated age, and the liquid is passed first to the oldest batch of iron and thence successively through batches of decreasing age to the newest batch thereof.

8. A process for the precipitation of copper from solutions thereof by contact with iron as claimed in claim 7 wherein when the oldest batch of iron is exhausted it is removed from the series and a fresh batch of iron is added at the other end of the series.

9. A process for the precipitation of metals from liquids by contact with a precipitating body wherein successive batches of precipitating body are disposed in series in graduated age, the liquid is passed first to the oldest batch of precipitating body and thence successively through batches of decreasing age to the newest batch thereof, and as precipitation progresses fresh batches of precipitating body are disposed at one end of the series and old batches cut out from the other whereby each batch is progressively treated with solution of increasing strength.

10. A process for the precipitation of metals from liquids by contact with the precipitating body wherein solutions of progressively increasing strength are successively applied to the precipitating body for the purpose of more effectively securing precipitation thereon.

In testimony whereof I affix my signature.
ALEXANDER GRANT McGREGOR.